United States Patent
Gamble (10) Patent No.: US 12,079,562 B1
(45) Date of Patent: Sep. 3, 2024

(54) MATHEMATICAL SYMBOLS KEYBOARD FOR MATHEMATICAL APPLICATIONS

(71) Applicant: Matthew R. Gamble, Hockessin, DE (US)

(72) Inventor: Matthew R. Gamble, Hockessin, DE (US)

(*) Notice: Subject to any disclaimer, the term of this patent is extended or adjusted under 35 U.S.C. 154(b) by 312 days.

(21) Appl. No.: 17/358,938

(22) Filed: Jun. 25, 2021

Related U.S. Application Data (60) Provisional application No. 63/045,405, filed on Jun. 29, 2020.

(51) Int. Cl.
  G06F 40/111 (2020.01)
  G06F 3/02 (2006.01)
  G06F 3/023 (2006.01)

(52) U.S. Cl.
  CPC .......... G06F 40/111 (2020.01); G06F 3/0219 (2013.01); G06F 3/0238 (2013.01)

(58) Field of Classification Search
  None
  See application file for complete search history.

(56) References Cited

U.S. PATENT DOCUMENTS

| | | |
|---|---|---|
| 3,927,752 A | 12/1975 | Jones et al. |
| 4,152,774 A | 5/1979 | Olander, Jr. et al. |
| 2007/0286663 A1* | 12/2007 | Kinney ................. G06F 3/0235 400/489 |
| 2010/0115403 A1* | 5/2010 | Sargent, III .......... G06F 40/111 715/267 |
| 2017/0031588 A1* | 2/2017 | Berger ................ G06F 3/03547 |
| 2018/0129413 A1* | 5/2018 | Berger .................. G06F 3/0238 |

FOREIGN PATENT DOCUMENTS

KR  101791929 B1 *  1/2017

* cited by examiner

*Primary Examiner* — Qing Chen
(74) *Attorney, Agent, or Firm* — Barnes & Thornburg LLP (57) ABSTRACT

Devices, systems, and methods can include a source mathematical application, a destination mathematical application, and a mathematical symbol conversion application. Such devices, systems, and methods can, in response to detecting that data indicative of a mathematical symbol has been copied from the source mathematical application, use the mathematical symbol conversion application to identify a first language associated with the source mathematical application and, in response to detecting that the copied data has been pasted into the destination mathematical application, identify a second language associated with the destination mathematical application, convert the copied data from the first language to the second language, and reproduce the copied data in the second language within the second mathematical application, wherein the first and second languages are different from one another, and wherein the reproduced data retains visual and operational qualities of the copied data.

20 Claims, 5 Drawing Sheets

MATHEMATICAL SYMBOLS KEYBOARD FOR MATHEMATICAL APPLICATIONS

CROSS-REFERENCE

This Non-provisional Patent application claims the benefit of priority to U.S. Provisional Patent Application No. 63/045,405, filed on Jun. 29, 2020, the contents of which are hereby incorporated by reference in their entirety, including but not limited to those portions concerning mathematical expression.

TECHNICAL FIELD

The present disclosure generally relates to systems and methods for inputting, digital rendering, and transfer of specialized mathematical symbols.

BACKGROUND

The use of simple and complex mathematical symbols and characters is common place among scientists and students, specialists and generalists alike. Indeed, mathematical symbols and notation may be considered a universal language among people from around the world.

SUMMARY

According to an aspect of the present disclosure, a system includes a processor configured to execute a source mathematical application, a destination mathematical application, and a mathematical symbol conversion application, the processor being configured to, in response to detecting that data indicative of a mathematical symbol has been copied from the source mathematical application, use the mathematical symbol conversion application to identify a first language associated with the source mathematical application and, in response to detecting that the copied data has been pasted into the destination mathematical application, identify a second language associated with the destination mathematical application, convert the copied data from the first language to the second language, and reproduce the copied data in the second language within the second mathematical application, wherein the first and second languages are different from one another, and wherein the reproduced data retains visual and operational qualities of the copied data.

According to another aspect of the present disclosure, a system may include a processor configured to execute a source mathematical application, a destination mathematical application, and a mathematical symbol conversion application. The processor may be configured to, in response to detecting that data indicative of a mathematical symbol has been copied from the source mathematical application, use the mathematical symbol conversion application to identify a first language associated with the source mathematical application and, in response to detecting that the copied data has been pasted into the destination mathematical application, identify a second language associated with the destination mathematical application, convert the copied data from the first language to the second language, and reproduce the copied data in the second language within the second mathematical application. The first and second languages may be different from one another. The reproduced data may retain visual and/or operational qualities of the copied data.

In some embodiments, detecting that the copied data has been pasted into the destination mathematical application may include detecting indication of user intent to paste the copied data into the destination mathematical application. Detecting indication of user intent to paste the copied data into the destination mathematical application may include receiving user input to activate pasting of the copied data.

In some embodiments, converting the copied data from the first language to the second language may include converting the first language to an intermediary language. The intermediary language may be a universal or standard language. The intermediary language may include at least one of ASCII and Unicode.

In some embodiments, the processor may be configured to receive user input comprising one or more of mathematical values, functions, or other specialized notation. The processor may be configured to convert user input comprising one or more of mathematical values, functions, or other specialized notation into the second language.

According to another aspect of the present disclosure, a method may comprise, by a processor, in response to detecting that data indicative of a mathematical symbol has been copied from the source mathematical application, using a mathematical symbol conversion application to identify a first language associated with the source mathematical application and, in response to detecting that the copied data has been pasted into the destination mathematical application, identifying a second language associated with the destination mathematical application, converting the copied data from the first language to the second language, and reproducing the copied data in the second language within the second mathematical application. The first and second languages may be different from one another. The reproduced data may retain visual and/or operational qualities of the copied data.

In some embodiments, detecting that the copied data has been pasted into the destination mathematical application may include detecting indication of user intent to paste the copied data into the destination mathematical application. Detecting indication of user intent to paste the copied data into the destination mathematical application may include receiving user input to activate pasting of the copied data.

In some embodiments, converting the copied data from the first language to the second language may include converting the first language to an intermediary language. The intermediary language may be a universal or standard language. The intermediary language may include at least one of ASCII and Unicode.

In some embodiments, the method may further include, by the processor, receiving user input comprising one or more of mathematical values, functions, or other specialized notation. The method may further include converting the user input comprising one or more of mathematical values, functions, or other specialized notation into the second language.

According to another aspect of the present disclosure, a non-transitory computer readable storage media may comprise a plurality of instructions stored thereon that may, when executed by a computing device, cause a processor of the computing device to, in response to detecting user input data indicative of a mathematical symbol, identify an encoding associated with a mathematical application to which the user input is directed, convert the data into the identified encoding associated with the mathematical application, and display the converted data in the mathematical application. The user input may be entered using at least one of a plurality of mathematical symbol keys of a mathematical symbol keyboard communicatively coupled to the processor. The displayed data may correspond visually and/or operationally to the mathematical symbol associated with the at least one of the plurality of mathematical symbol keys used to enter the user input.

BRIEF DESCRIPTION OF THE DRAWINGS

The detailed description particularly refers to the following figures providing illustrative embodiments, in which.

DETAILED DESCRIPTION

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Despite mathematical symbols being nearly universal across the world, there currently does not exist a symbol conversion application enabling a transfer of mathematical characters and symbols from one application to another. Instead, each individual math-related program utilizes its own unique character set. This is not an issue when a user is working inside a single mathematical application or program. However, issues may arise when a user tries to transfer mathematical symbols, equations, or characters between multiple programs or applications. For example, a user who copies a given equation from a first mathematical application (e.g., SymboLab™, an online calculator) and pastes the copied equation into a second mathematical application or program (e.g., WebAssign™, a web-based application for completing math homework) may find that the copied equation (as shown, for example, in Equation (1)) is not rendered (displayed) accurately when pasted within the second application (as shown, for example, in Equation (2)).

$$\int \frac{\theta \pi^2}{2} d\theta = \frac{\pi^2 \theta^2}{4} + C \qquad (1)$$

$$\backslash init \backslash frac\left\{\pi^{2)\{2\}d=\backslash frac\left\{\pi^{2\}\{4\}-C} \qquad (2)$$

As such, when copying and pasting a mathematical equation between different mathematical applications or programs, distortions may occur to the equation formatting, layout, displayed characters and symbols, and other aspects of meaning and presentation. In some instances, the distortion may be such that the information conveyed by the equation is lost partially or entirely. The present systems and methods are directed to implementing seamless copying and pasting of mathematical equations between and among different mathematical programs, applications, and interfaces.

Moreover, an efficient way is currently unavailable for inputting (e.g., by way of typing using a standard keyboard interface) mathematical characters and equations onto a computer application or program. In particular, standard keyboards lack dedicated keys for inputting advanced mathematical symbols, such as polynomial functions, fractions, integrals, differentials, complex exponents or subscripts, summation letter symbols, square roots, and other specialized mathematical, algebraic, trigonometric, logarithmic, and statistical symbols, characters, and notations. The present systems and methods are directed to implementing a mathematical symbol keyboard configured to provide for direct input of such specialized mathematical terminology, representations, and notation.

Figure 1:
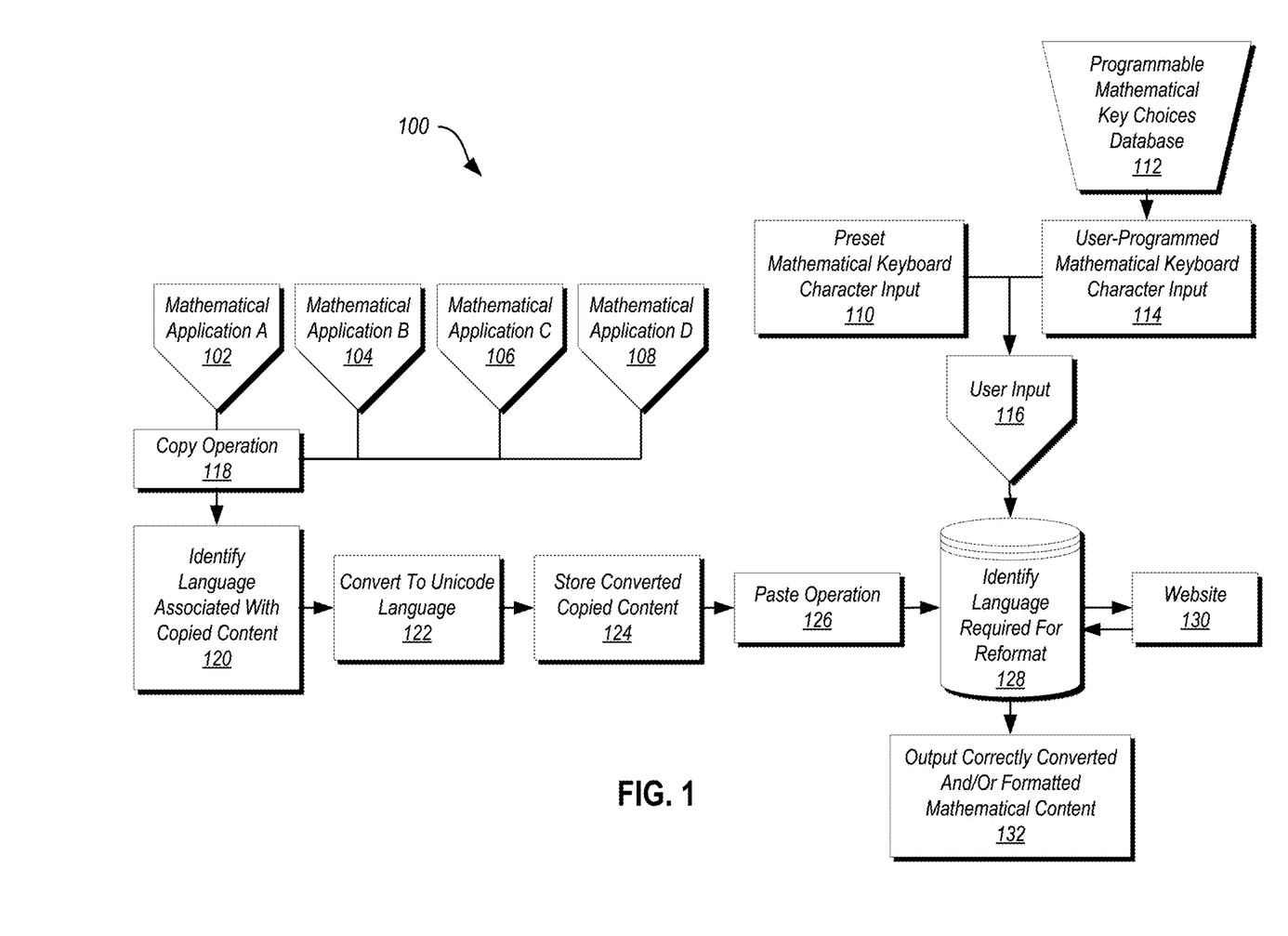
FIG. 1 is a block diagram illustrating a system for seamlessly reproducing mathematical symbols between and among different mathematical applications, the system including a mathematical keyboard.

Referring now to FIG. 1, a system 100 for seamlessly reproducing mathematical notation includes a plurality of mathematical applications 102, 104, 106, and 108 configured to receive user input indicative of mathematical functions, symbols, and other specialized mathematical notation. As will be described in further detail below (see, e.g., FIG. 2), the mathematical applications 102, 104, 106, and 108 may reside on or be hosted/executed by a computing device, server, or another system or device. Example mathematical applications 102, 104, 106, and 108 include, but are not limited to, Symbolab™, WebAssign™, Mastering-Site, Matlab, Mathematica, or another calculation tool.

The system 100 may be configured to detect a user-invoked copy operation 118 from an active interface of one of the mathematical applications 102, 104, 106, and 108, i.e., the source mathematical application. In an example, a user can invoke a copy operation 118 using one or more input devices communicatively coupled to the mathematical applications 102, 104, 106, and 108 (or to the computing device hosting/executing the source mathematical application), such as, but not limited to, keyboard, mouse, stylus, or pointer.

The system 100 may identify 120 mathematical symbol language or encoding type associated with the mathematical application 102, 104, 106, and 108 from which the mathematical content was copied by way of the copy operation 118, i.e., language/encoding associated with the source mathematical application. Once the language or encoding associated with the application has been identified, the system 100 converts 122 the copied data from the identified language to a universal or standard language or encoding, such as, but not limited to, American Standard Code for Information Interchange (ASCII) or Unicode. The system 100 stores 124 the converted version of the copied data in a temporary or permanent storage.

The system 100 is further configured to detect a user-invoked paste operation 126 in connection with one of the mathematical applications 102, 104, 106, and 108, e.g., using one or more input devices connected to the mathematical applications 102, 104, 106, and 108 (or to the computing device that hosts/executes the mathematical applications 102, 104, 106, and 108). The system 100 may identify 128 the language or encoding corresponding to the second mathematical application 102, 104, 106, and 108 to which the paste operation 126 is directed, i.e., the destination mathematical application. Upon identifying the language of the second mathematical application, the system 100 may retrieve the stored converted version of the copied data and may convert the copied data from a universal or standard language or encoding to the language associated with the second mathematical application, i.e., the destination mathematical application. Following completion of the conversion, the system 100 outputs 132 the copied content in the paste operation mathematical application in a language or encoding that corresponds to the second mathematical application associated with the paste operation, i.e., the destination mathematical application.

The system 100 is configured to receive user input 116 invoked by way of a preset character input 110, a programmable key choices database 112, and a user-programmed input 114. The user input 116 may comprise input entered using one or more preset character keys or user-programmed keys of a mathematical keyboard. In an example, values, functions, or mathematical operators associated with the user-programmed keys of the mathematical keyboard may reference one or more mathematical values, functions, or other specialized notation stored in the programmable key choices database or library 112. In some embodiments, the keyboard be any suitable manner of user interface, for example but without limitation, touchscreen input, touchless-gesture input, and/or virtual keyboard.

In response to detecting user input 116, the system 100 may identify 128 the language or encoding corresponding to the currently active mathematical application 102, 104, 106, and 108. In some instances, the system 100 may reference a website 130 to determine the language or encoding corresponding to the currently active mathematical application. Upon identifying the language of the active application, the system 100 may convert the user input data from a universal or standard language or encoding to the language associated with the active mathematical application 102, 104, 106, and 108. Following completion of the conversion, the system 100 outputs (e.g., displays, renders, or transmits for displaying or rendering) 132 mathematical value, function, or operator associated with the user input formatted in the language or encoding that corresponds to the active mathematical application 102, 104, 106, and 108.

Figure 2:
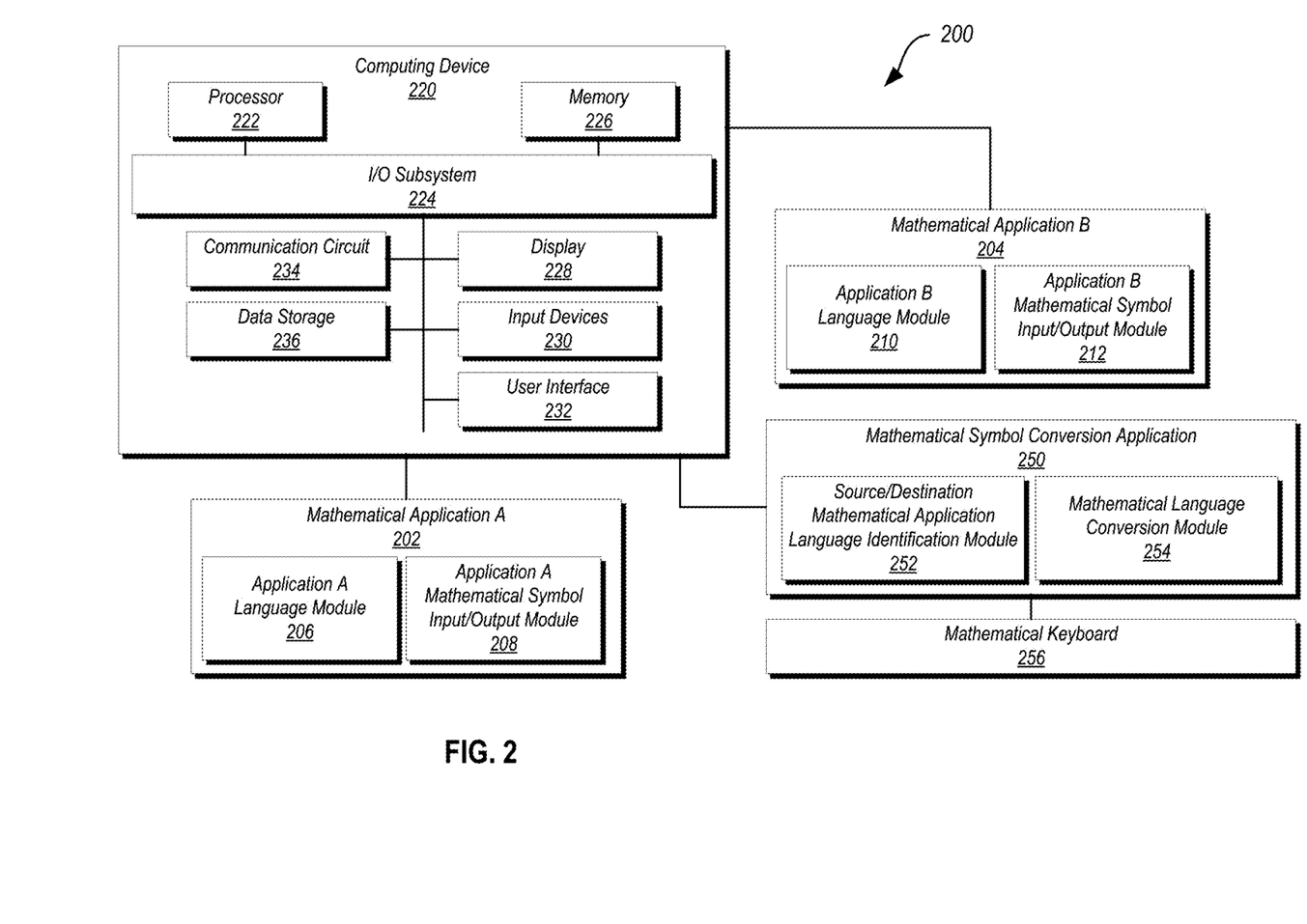
FIG. 2 is a block diagram illustrating a computing device configured to host a mathematical symbol conversion application communicatively connected to a mathematical keyboard.

FIG. 2 illustrates an exemplary implementation 200 of a computing device 220. The computing device 220 may be embodied as any type of compute device capable of performing described functions, including, but not limited to, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device. The computing device 220 comprises one or more of a single device, such as an integrated circuit, an embedded system, a field-programmable gate array (FPGA), a system-on-a-chip (SOC), an application-specific integrated circuit (ASIC), reconfigurable hardware or hardware circuitry, or other specialized hardware to facilitate performance of the functions described herein.

Exemplary computing devices 220 include one or more audio and visual output devices, such as, but not limited to, speakers and displays, and one or more audio and visual input devices, such as, but not limited to, microphones and cameras. Exemplary computing device 220 may receive user input using one or more user input interfaces, such as, but not limited to, touch screens, touch pads, digital and/or physical buttons, keys, and keyboards. Additionally or alternatively, computing device 220 may be configured to perform speech, face, and hand gesture recognition and/or receive user input by way of voice commands, stylus inputs, single- or multi-touch gestures, and touchless hand gestures.

The computing device 220 includes a processor 222, an I/O subsystem 224, a memory 226, a display 228, input device(s) 230, a user interface 232, a communication circuit 234, and a data storage 236. Of course, in other embodiments, the computing device 220 may include alternative or additional components, such as those commonly found in a server, router, switch, or other network device. Additionally, in some embodiments, one or more of the illustrative components may be incorporated in, or otherwise form a portion of, another component. For example, the memory 226, or portions thereof, may be incorporated in one or more processors 222.

The processor 222 may be embodied as any type of processor capable of performing the described functions.

For example, the processor 222 may be embodied as a single or multi-core processor(s), digital signal processor, microcontroller, or other processor or processing/controlling circuit. In some embodiments, the processor(s) 222 may be embodied as, include, or otherwise be coupled to an FPGA, an ASIC, reconfigurable hardware or hardware circuitry, or other specialized hardware to facilitate performance of the described functions.

The memory 226 may be embodied as any type of volatile or non-volatile memory or data storage capable of performing the functions described herein. The memory 226 may be embodied as any type of volatile (e.g., dynamic random access memory (DRAM), etc.) or non-volatile memory or data storage capable of performing the described functions. It will be appreciated that the memory 226 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as DRAM or static random access memory (SRAM). In operation, the memory 226 may store various data and software used during operation of the computing device 220, such as operating systems, applications (e.g., mathematical applications 102, 104, 106, and 108 and/or mathematical applications 202, 204), programs, libraries, and drivers.

The memory 226 is communicatively coupled to the processor 222 via the I/O subsystem 224, which may be embodied as circuitry and/or components to facilitate input/output operations with the processor 222, the memory 226, and other components of the computing device 220. For example, the I/O subsystem 224 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 224 may form a portion of a system-on-a-chip (SoC) and be incorporated, along with the processors 222, the memory 226, and other components of the computing device 220, on a single integrated circuit chip.

The display 228 may be embodied as any type of display capable of displaying digital information to a user such as a liquid crystal display (LCD), a light emitting diode (LED), a plasma display, a cathode ray tube (CRT), or other type of display device. As described below, the display 228 may be used to display a graphical user interface or other information to the user of the computing device 220. Additionally, in some embodiments, the computing device 220 may include a touch screen coupled to or incorporated in the display 228. The touch screen may be used to receive user tactile input.

The communication circuit 234 may be embodied as any communication circuit, device, or collection thereof, capable of enabling communications between the computing device 220 and other devices via a wired or wireless network. To do so, the communication circuit 234 may be configured to use any one or more communication technology and associated protocols (e.g., Ethernet, Bluetooth®, Wi-Fi®, WiMAX, etc.) to effect such communication.

The data storage 236 may be embodied as any type of device or devices configured for short-term or long-term storage of data such as, for example, memory devices and circuits, memory cards, hard disk drives, solid-state drives, or other data storage devices. The data storage 236 and/or the memory 226 may store various other data useful during the operation of the computing device 220.

The computing device 220 hosts, executes, and/or provides interface for a first mathematical application 202 and a second mathematical application 204. The first and second mathematical applications 202, 204 may be embodied as any computer program or collection of computer programs capable of performing various described functions and may be implemented in accordance with one or more the mathematical applications 102, 104, 106, and 108 as described in reference to FIG. 1. While only the first and second mathematical applications 202, 204 are illustrated, it is understood that, in some other examples, the computing device 220 may host or execute a different number, e.g., more or fewer, of mathematical applications.

Each of the first and second mathematical applications 202, 204 includes interface accessible via one or more mobile or stationary user access systems supported or embodied by the computing device 220, such as, but not limited to, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device.

Upon activation, the first and second mathematical applications 202, 204 enable user to, via a corresponding user interface, input or perform operations on single or multiple advanced mathematical symbols, such as, but not limited to, polynomial functions, fractions, integrals, differentials, complex exponents or subscripts, summation letter symbols, square roots, and other specialized mathematical, algebraic, trigonometric, logarithmic, and statistical symbols, characters, and notations. Additionally or alternatively, interface layout of each of the first and second mathematical applications 202, 204 can include one or more indicators, features, and controls frequently found in UI architecture design, such as checkboxes, radio buttons, dropdown lists, list boxes, buttons, toggles, text fields, date field, breadcrumb, slider, search field, pagination, slider, tags, icons, tooltips, icons, progress bar, notifications, message boxes, and modal windows. Interfaces of each of the first and second mathematical applications 202, 204 may comprise keys or buttons linked to more detailed views. An input detection module of the computing device 220 may provide an indication to a software application presently executing on the computing device 220, such as via an application program interface (API). Accordingly, the software application may perform a desired task based on the indication.

The computing device 220 hosts or executes a mathematical symbol conversion application 250. The mathematical symbol conversion application 250 enables user to seamlessly transfer mathematical symbols and other specialized mathematical notation between and among the first and second mathematical applications 202, 204, such that the transferred symbols and notation retain their visual and functional representation. As one example, the mathematical symbol conversion application 250 enables user to copy mathematical symbols or other specialized mathematical notation from the first mathematical application 202 and paste the copied content into the second mathematical application 204, such that the pasted content retains its original visual representation (e.g., visually presented equation layout, used symbols and operators) and original mathematical operation functionality (e.g., functionality of mathematical operators, such as, but not limited to, integrals, derivatives, logarithmic functions, square roots, fractions, exponents, limits, and other algebraic, trigonometric, geometric, statistical, and calculus operators).

In an example, the first mathematical application 202 comprises a source mathematical application or the mathematical application from which one or more mathematical symbols is being copied and the second mathematical application 204 comprises a destination mathematical application or the mathematical application into which one or more previously copied mathematical symbols is being pasted. Each of the first and second mathematical applications 202, 204 comprise a corresponding one of first and second language modules 206, 210 and a corresponding one of first and second mathematical symbol input/output modules 208, 212. The first and second language modules 206, 210 comprise databases or libraries communicatively connected to the corresponding one of the first and second mathematical symbol input/output modules 208, 212, such that mathematical symbols entered (input) by the user and displayed (output) as part of rendering computational operations results appear and operate according to a respective one of first and second languages associated with the first and second mathematical applications 202, 204.

The first and second languages of the first and second mathematical applications 202, 204 may be different from one another and the first and second mathematical applications 202, 204 may not support a transfer of mathematical characters and symbols between one another and/or to a third mathematical application. Instead, each of the first and second languages may utilize its own unique character set. In an example, a user who copies a given equation from the first mathematical application (e.g., SymboLab™, an online calculator) 202 and pastes the copied equation into the second mathematical application (e.g., WebAssign™, a web-based application for completing math homework) 204 may find that the copied equation is not rendered (displayed or otherwise reproduced) accurately when pasted within the second mathematical application 204 and/or that the copied mathematical symbols or operators no longer retain their specialized functionality.

Figure 5:
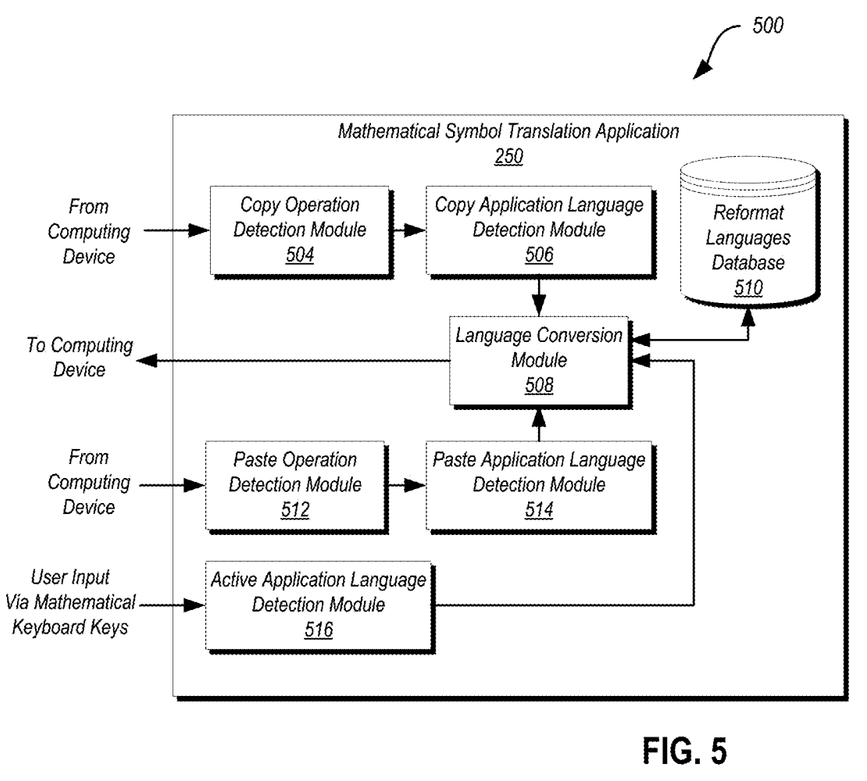
FIG. 5 is a block diagram illustrating an exemplary environment created by the mathematical symbol conversion application.

As described further in reference to at least FIG. 5, a source/destination mathematical application language identification module 252 of the mathematical symbol conversion application 250 identifies language or encoding associated with the first and second mathematical applications 202, 204 where the copy and paste operations are taking place. A mathematical language conversion module 254 is configured to convert copied data from the first language of the copy application to the second language of the paste application. Thus, the modules 252, 254 of the mathematical symbol conversion application 250 enables user to copy mathematical symbols or other specialized mathematical notation from the first mathematical application 202 and paste the copied content into the second mathematical application 204, such that the pasted content retains its original visual representation (e.g., visually presented equation layout, used symbols and operators) and original mathematical operation functionality (e.g., functionality of mathematical operators, such as, but not limited to, integrals, derivatives, logarithmic functions, square roots, fractions, exponents, limits, and other algebraic, trigonometric, geometric, statistical, and calculus operators).

Moreover, the first and second applications 202, 204 may not support an efficient way for inputting (e.g., by way of typing using a standard keyboard interface) mathematical characters and equations by the user onto interfaces of the first and second applications 202, 204, at least in part, because the standard keyboard of the computing device 220 lacks dedicated keys for inputting advanced mathematical symbols, such as polynomial functions, fractions, integrals, differentials, complex exponents or subscripts, summation letter symbols, square roots, and other specialized mathematical, algebraic, trigonometric, logarithmic, and statistical symbols, characters, and notations.

A mathematical keyboard 256 may be communicatively coupled to the computing device 220 directly, e.g., via one or more input device interfaces, and/or indirectly, e.g., via the mathematical symbol conversion application 250. The mathematical keyboard 256 comprises a plurality of pre-programmed and programmable keys for inputting advanced mathematical functions, such as, but not limited to, polynomial functions, fractions, integrals, differentials, complex exponents or subscripts, summation letter symbols, square roots, and other specialized mathematical, algebraic, trigonometric, logarithmic, and statistical symbols, characters, and notations (see, e.g., FIGS. 6 and 7). The mathematical keyboard 256 operates to allow efficient inputting of mathematical characters and equations onto each of a plurality of the mathematical applications 102, 104, 106, and 108. In particular, the mathematical keyboard 256 operates to allow seamless entry of specialized mathematical notation such that the entered content visually and functionally corresponds to the language or encoding associated with the active mathematical application, i.e., such that the entered content retains, across the plurality of mathematical applications and languages, its intended visual representation (e.g., visually presented equation layout, used symbols and operators) and intended mathematical operation functionality (e.g., functionality of mathematical operators, such as, but not limited to, integrals, derivatives, logarithmic functions, square roots, fractions, exponents, limits, and other algebraic, trigonometric, geometric, statistical, and calculus operators).

Referring now to FIG. 5, in use, the mathematical symbol conversion application 250 establishes an environment 500. The illustrative environment 500 includes a copy operation detection module 504, a copy application language detection module 506, a language conversion module 508, a reformat languages database 510, a paste operation detection module 512, a paste application language detection module 514, and an active application language detection module 516. Each of the modules and other components of the environment 500 may be embodied as firmware, software, hardware, or a combination thereof. For example the various modules, logic, and other components of the environment 500 may form a portion of, or otherwise be established by, the processor 222, the I/O subsystem 224, an SoC, or other hardware components of the computing device 220. As such, in some embodiments, any one or more of the modules of the environment 500 may be embodied as a circuit or collection of electrical devices (e.g., a copy operation detection circuit, a copy application language detection circuit, a language conversion circuit, a reformat language circuit, a paste operation detection circuit, a paste operation language detection circuit, an active application language detection circuit, etc.).

The copy operation detection module 504 detects a user-invoked mathematical symbol copy operation. For example, the user may copy one or more mathematical symbols, formulas, or equations by one or more of clicking, double clicking, clicking and dragging, clicking and selecting, using standard keyboard keys (e.g., simultaneously selecting CTRL+C keys to copy highlighted content), using speech commands, gestures, or some combination thereof. The paste operation detection module 512 detects a user-invoked mathematical symbol paste operation. For example, the user may paste one or more previously copied mathematical symbols, formulas, or equation by clicking, double clicking, clicking and dragging, clicking and selecting from a drop down or pop-up menu, using standard keyboard keys (e.g., simultaneously selecting CTRL+V keys to paste previously copied content), using speech commands, gestures, or some combination thereof.

The copy operation detection module 504 is communicatively coupled to the copy application language detection module 506. Likewise, the paste operation detection module 512 is communicatively coupled to the paste application language detection module 514. In response to the copy operation being detected, the copy application language detection module 506 detects or identifies a language or encoding associated with the first mathematical application in which the detected copy operation occurred, i.e., the source mathematical application. In response to the paste operation being detected, the paste application language detection module 514 detects or identifies a language or encoding associated with the second mathematical application in which the detected paste operation occurred, i.e., the destination mathematical application. The copy application language detection module 506 and the paste application language detection module 514 may identify the mathematical application 102, 104, 106, and 108 from which the copied content has originated, i.e., the source mathematical application, and into which the pasted content is directed, i.e., the destination mathematical application, respectively.

The language conversion module 508 is communicatively connected to each of the copy application language detection module 506 and the paste application language detection module 514. The language conversion module 508 may convert and/or reformat the copied content from the language associated with the first mathematical application in which the copy operation occurred, i.e., the source mathematical application, into a standard language or encoding, such as ASCII or Unicode, and may store the converted copied content in volatile or non-volatile memory. The language conversion module 508 may also convert and/or reformat the stored converted copied content from a standard language or encoding into the language associated with the second mathematical application identified as being the mathematical application in which the paste operation is occurring, i.e., the destination mathematical application.

The language conversion module 508 is communicatively coupled to the reformat languages database 510 that comprises a depository or a library of a plurality of mathematical applications and languages associated with those mathematical applications. The language conversion module 508 may be configured to poll the reformat languages database 510 to determine how to convert the copied content from the first language associated with the first mathematical application in which the content was copied, i.e., the source mathematical application, to a standard language or encoding and/or from a standard language or encoding into the second language associated with the second mathematical application into which the content is being pasted, i.e., the destination mathematical application. In some examples, the language conversion module 508 may be configured to convert and/or reformat the copied content from the first language associated with the source mathematical application directly into the second language associated with the destination mathematical application without first converting the copied content into a standard language or encoding.

Once conversion and/or reformatting is completed, the language conversion module 508 outputs the formatted copied content to the computing device 220 to be displayed within the interface of the second mathematical application.

As described above in reference to at least FIG. 2, the mathematical symbol conversion application 250 is communicatively coupled to the mathematical keyboard 256, such that the mathematical symbol conversion application 250 detects a user-invoked input using one or more keys, digital and/or physical buttons, or other input control of the mathematical keyboard 256. In an example, the active application language detection module 516 detects a user-invoked input using one or more keys, digital and/or physical buttons, or other input control of the mathematical keyboard 256. The active application language detection module 516 may identify the language associated with the mathematical application in which the user-invoked input of mathematical symbols or other notation is presently occurring. In an example, the active application language detection module 516 may receive input from the mathematical keyboard 256 in a standard language or encoding, such as, but not limited to, ASCII or Unicode.

The active application language detection module 516 is communicatively coupled to the language conversion module 508. Upon receiving, from the active application language detection module 516, data associated with user input via the keys of the mathematical keyboard 256, the language conversion module 508 may convert and/or reformat received input data from a standard language or encoding into the language or encoding associated with the active mathematical application. Once conversion, conversion, or reformatting is completed, the language conversion module 508 outputs the formatted user input content to the computing device 220 to be displayed within the interface of the active mathematical application.

Figure 3:
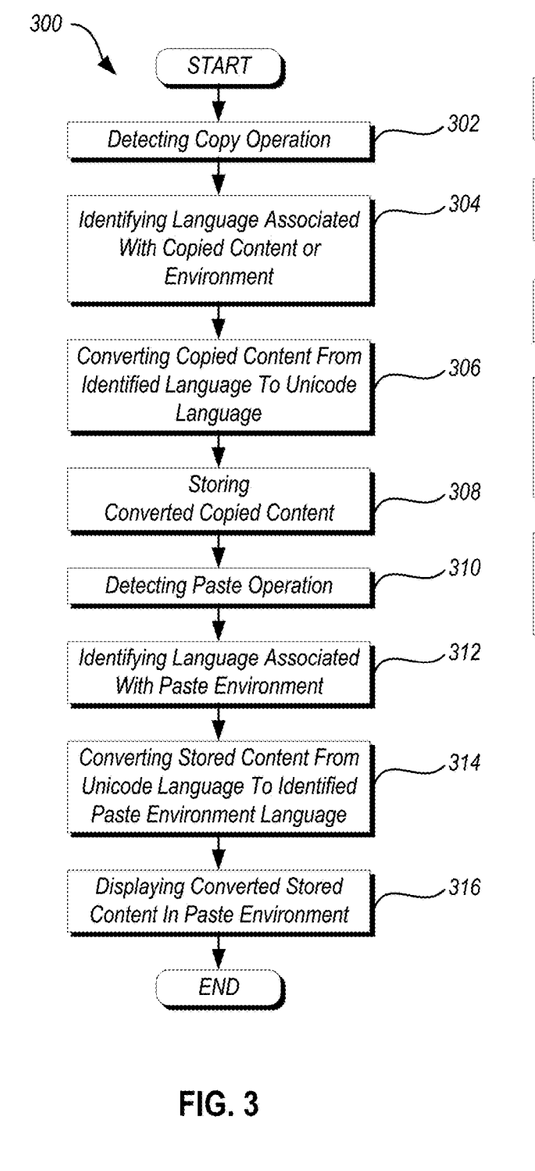
FIG. 3 is a block diagram illustrating an exemplary process flow for converting and/or reformatting copied content into a language of a mathematical application where the copied content is being pasted.

FIG. 3 illustrates an exemplary process 300 for seamlessly reproducing mathematical symbols previously copied from the source application and being pasted into the destination application. In some embodiments, the process 300 may be executed by the processor 222 using one or more modules of the mathematical symbol conversion application 250 (e.g., the copy operation detection module 504, the copy application language detection module 506, the language conversion module 508, the reformat languages database 510, the paste operation detection module 512, the paste application language detection module 514, and the active application language detection module 516, etc.). The process 300 may begin at block 302 where the processor 222 detects a user-invoked copy operation from an active interface of the first mathematical application 202. In an example, a user can invoke a copy operation using one or more input devices connected to the computing device 220, such as, but not limited to, keyboard, mouse, stylus, or pointer.

At block 304, the processor 222 may identify a first mathematical symbol language or encoding type associated with the first mathematical application from which the mathematical content was copied by way of the copy operation. Once the first language or encoding associated with the first mathematical application has been identified, the processor 222, at block 306, converts the copied data from the identified first language to a universal or standard language or encoding, such as, but not limited to, ASCII or Unicode. At block 308, the processor 222 stores the converted version of the copied data in a temporary or permanent storage.

At block 310, the processor 222 detects a user-invoked paste operation in connection with the second mathematical application 204, e.g., using one or more input devices connected to the computing device 220. The processor 222 may identify, at block 312, the second language or encoding corresponding to the second mathematical application 204 to which the paste operation is directed, i.e., the destination mathematical application. Upon identifying the second language of the second mathematical application, the processor 222, at block 314, may retrieve the stored converted version of the copied data and may convert the copied data from a universal or standard language or encoding to the second language associated with the second mathematical application, i.e., the destination mathematical application. At block 316, following completion of the conversion, the processor 222 outputs the copied content in the second mathematical application in the second language or encoding that corresponds to the second mathematical application associated with the paste operation, i.e., the destination mathematical application. The process 300 may then end. In other examples, the process 300 may be repeated in response to a determination, by the processor 222, that a copy operation has been detected or in response to a different signal or command.

Figure 4:
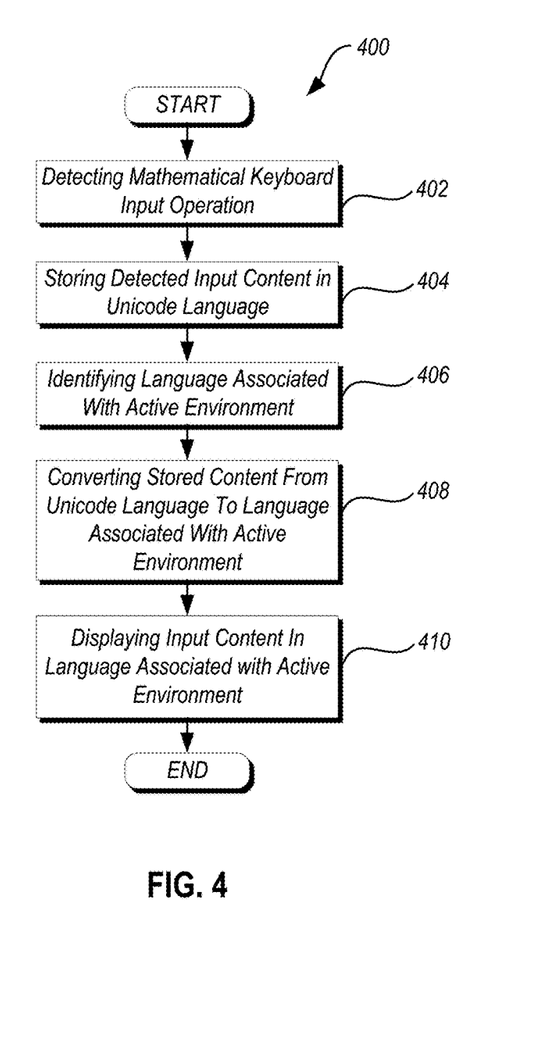
FIG. 4 is a block diagram illustrating an exemplary process flow for entering mathematical symbols and notation into one of a plurality of mathematical applications using a mathematical symbol keyboard.

FIG. 4 illustrates an exemplary process 400 for efficiently entering mathematical symbols within each of a plurality of mathematical applications. In some embodiments, the process 400 may be executed by the processor 222 using the mathematical keyboard 256 and one or more modules of the mathematical symbol conversion application 250 (e.g., the copy operation detection module 504, the copy application language detection module 506, the language conversion module 508, the reformat languages database 510, the paste operation detection module 512, the paste application language detection module 514, and the active application language detection module 516, etc.).

The process 400 may begin at block 402 where the processor 222 detects user input invoked by way of one or more keys of the mathematical keyboard 256 (e.g., a preset character input keys, a user-programmed input keys, and so on). The detected user input may comprise input entered using one or more preset character keys or user-programmed keys of a mathematical keyboard. In an example, values, functions, or mathematical operators associated with the user-programmed keys of the mathematical keyboard may reference one or more mathematical values, functions, or other specialized notation stored in the programmable key choices database or library 112. In some instances, the processor 222 receives data associated with the detected user input in a standard language or encoding format. The processor 222, at block 404, stores the received user input data in the volatile or non-volatile memory.

In response to detecting user input, the processor 222, at block 406, may identify the language or encoding corresponding to the currently active mathematical application. At block 408, upon identifying the language of the active application, the processor 222 converts the user input data from a universal or standard language or encoding to the language associated with the active mathematical application. Following completion of the conversion, the processor 222, at block 410, outputs (e.g., displays, renders, or transmits for displaying or rendering) mathematical value, function, or operator associated with the user input formatted in the language or encoding that corresponds to the active mathematical application. The process 400 may then end. In other examples, the process 400 may be repeated in response to a determination, by the processor 222, that an input by way of the mathematical keyboard 256 has been detected or in response to a different signal or command.

Figure 6:
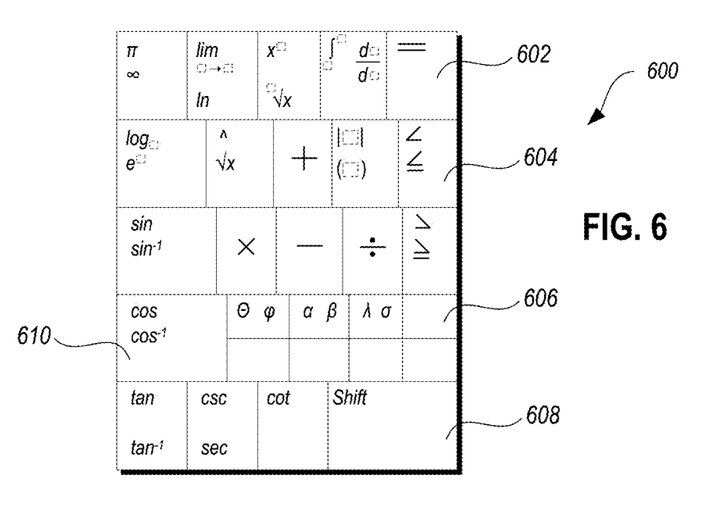
FIGS. 6 and 7 are block diagrams illustrating exemplary layouts of the mathematical symbol keyboard.
Figure 7:
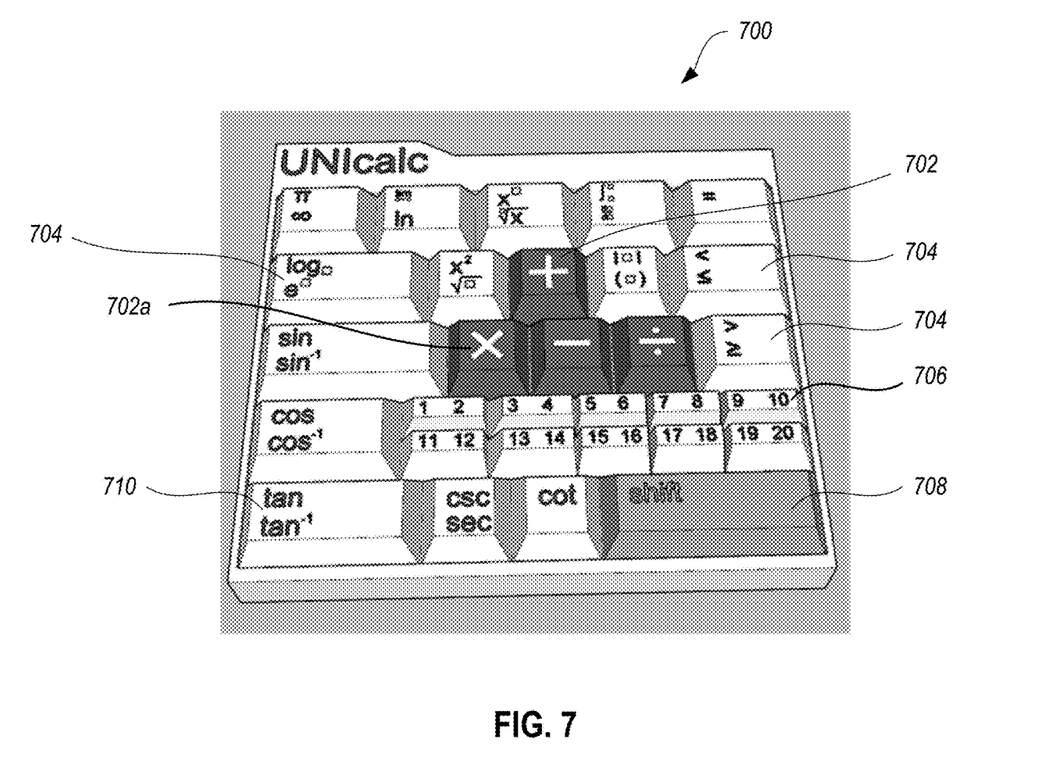

FIGS. 6 and 7 illustrate exemplary layouts 600 and 700 of the mathematical symbol keyboard 256, respectively. FIG. 6 illustrates an exemplary layout 600 of the mathematical symbol keyboard 256. The mathematical symbol keyboard 256 may comprise a plurality of buttons or keys 602, 604, 606, 608, and 610 that allow for input of all the mathematical functions found on a typical scientific calculator. In addition to standard math functions, the mathematical symbol keyboard 256 includes assignable (user-programmable) keys 606. Examples of data included in the library would be Greek letters, mathematical constants, and 'empty' formulas. Each of a plurality of mathematical functions or symbols in the library may be assigned to one or more user-programmable keys 606 such that, upon pressing one of the assignable keys 606 (alone or in combination of one or more keys 602, 604, 606, 608, and 610) on the mathematical symbol keyboard 256, the corresponding assigned function or symbol may be rendered, reproduced, or displayed allowing for quick and efficient math computation.

Shown in FIG. 7 is an example three-dimensional rendering 700 of the mathematical symbol keyboard 256. Each of mathematical operator keys 702 may comprise both visual representation of the operator, such as plus sign, minus sign, division sign, and multiplication sign, as well as, a mathematical functionality of the operator, such as addition, subtraction, division, and multiplication, respectively. For example, selecting a multiplication key 702a may cause the mathematical symbol keyboard 256 to render an associated multiplication symbol, e.g., 'X' or '*', and/or to execute multiplication operation where appropriate numbers to be multiplied are present. Likewise, selecting each of a plurality of inequality keys 704 (alone or in combination with a modifier key 708, such as a SHIFT key) may cause the keyboard 256 to render an associated inequality symbol, e.g., ">", "<", and so on, and/or to validate whether the inequality operator has been used correctly. Each of a plurality of trigonometric function keys 710 may, upon selection, both render a visual representation of a corresponding trigonometric function and/or execute the mathematical function where appropriate numerical value or variable is present. As described previously, each of a plurality of user-programmable keys 706 may be selectively assigned one or more values, symbols, functions, or operators.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

I claim:

1. A system for rendering a mathematical symbol across different mathematical applications, the system comprising:
a processor configured to execute a source mathematical application, a destination mathematical application, and a mathematical symbol conversion application, the processor being configured to:
in response to detecting that data indicative of a mathematical symbol has been copied from the source mathematical application, execute the mathematical symbol conversion application to identify a first mathematical language associated with the source mathematical application, and
in response to detecting that the copied data indicative of the mathematical symbol has been pasted into the destination mathematical application, execute the mathematical symbol conversion application to:
identify a second mathematical language associated with the destination mathematical application,
poll a reformat languages database for operations to perform for converting the copied data indicative of the mathematical symbol from the first mathematical language to the second mathematical language,
convert, using the polled operations, the copied data indicative of the mathematical symbol from the first mathematical language to the second mathematical language, and
render the copied data indicative of the mathematical symbol in the second mathematical language within the destination mathematical application,
wherein the first and second mathematical languages are different from one another, and
wherein the rendered data indicative of the mathematical symbol retains, in the second mathematical language associated with the destination mathematical application, visual and operational qualities associated with the copied data indicative of the mathematical symbol from the source mathematical application.

2. The system of claim 1, wherein detecting that the copied data indicative of the mathematical symbol has been pasted into the destination mathematical application comprises detecting an indication of user intent to paste the copied data indicative of the mathematical symbol into the destination mathematical application.

3. The system of claim 2, wherein detecting the indication of user intent to paste the copied data indicative of the mathematical symbol into the destination mathematical application comprises receiving a user input to activate pasting of the copied data indicative of the mathematical symbol into the destination mathematical application.

4. The system of claim 1, wherein converting, using the polled operations, the copied data indicative of the mathematical symbol from the first mathematical language to the second mathematical language comprises converting the copied data indicative of the mathematical symbol from the first mathematical language to an intermediary mathematical language.

5. The system of claim 4, wherein the intermediary mathematical language is a universal or standard language.

6. The system of claim 5, wherein the intermediary mathematical language includes at least one of American Standard Code for Information Interchange (ASCII) and Unicode.

7. The system of claim 1, wherein the processor is further configured to receive a user input comprising one or more of mathematical values, functions, or other specialized notations.

8. The system of claim 7, wherein the processor is further configured to convert the user input comprising the one or more of mathematical values, functions, or other specialized notations into the second mathematical language.

9. A method for rendering a mathematical symbol across different mathematical applications, the method comprising:
detecting, by a processor, that data indicative of a mathematical symbol has been copied from a source mathematical application,
executing, by the processor and in response to the detection, a mathematical symbol conversion application to identify a first mathematical language associated with the source mathematical application, and
in response to detecting, by the processor, that the copied data indicative of the mathematical symbol has been pasted into a destination mathematical application, executing a mathematical symbol conversion application to:
identify a second mathematical language associated with the destination mathematical application,
poll a reformat languages database for operations to perform for converting the copied data indicative of the mathematical symbol from the first mathematical language to the second mathematical language,
convert, using the polled operations, the copied data indicative of the mathematical symbol from the first mathematical language to the second mathematical language, and
render the copied data indicative of the mathematical symbol in the second mathematical language within the destination mathematical application,
wherein the first and second mathematical languages are different from one another, and
wherein the rendered data indicative of the mathematical symbol retains, in the second mathematical language associated with the destination mathematical application, visual and operational qualities associated with the copied data indicative of the mathematical symbol from the source mathematical application.

10. The method of claim 9, wherein detecting that the copied data indicative of the mathematical symbol has been pasted into the destination mathematical application comprises detecting an indication of user intent to paste the copied data indicative of the mathematical symbol into the destination mathematical application.

11. The method of claim 10, wherein detecting the indication of user intent to paste the copied data indicative of the mathematical symbol into the destination mathematical application comprises receiving a user input to activate pasting of the copied data indicative of the mathematical symbol into the destination mathematical application.

12. The method of claim 9, wherein converting, using the polled operations, the copied data indicative of the mathematical symbol from the first mathematical language to the second mathematical language comprises converting the copied data indicative of the mathematical symbol from the first mathematical language to an intermediary mathematical language.

13. The method of claim 12, wherein the intermediary mathematical language is a universal or standard language.

14. The method of claim 13, wherein the intermediary mathematical language includes at least one of American Standard Code for Information Interchange (ASCII) and Unicode.

15. The method of claim 9, further comprising receiving, by the processor, a user input comprising one or more of mathematical values, functions, or other specialized notations.

16. The method of claim 15, further comprising converting, by the processor, the user input comprising the one or more of mathematical values, functions, or other specialized notations into the second mathematical language.

17. A non-transitory computer-readable storage medium comprising a plurality of instructions stored thereon that, when executed by a computing device, cause a processor of the computing device to:
   in response to detecting user input data indicative of a mathematical symbol, identify an encoding associated with a destination mathematical application to which the user input data is directed, wherein the mathematical symbol is in a first mathematical language, and wherein the encoding associated with the destination mathematical application comprises a second mathematical language that is different than the first mathematical language;
   poll a reformat languages database for operations to perform for converting the user input data from the first mathematical language to the identified encoding associated with the destination mathematical application;
   convert, using the polled operations, the user input data from the first mathematical language to the identified encoding associated with the destination mathematical application; and
   display the converted user input data in the destination mathematical application,
   wherein the user input data is entered using at least one of a plurality of mathematical symbol keys of a mathematical symbol keyboard communicatively coupled to the processor of the computing device, and
   wherein the displayed user input data corresponds visually and operationally to the mathematical symbol associated with the at least one of the plurality of mathematical symbol keys used to enter the user input data.

18. The non-transitory computer-readable storage medium of claim 17, wherein the user input data comprises the mathematical symbol that has been copied from a source mathematical application, and wherein the source mathematical application is different than the destination mathematical application.

19. The non-transitory computer-readable storage medium of claim 17, wherein converting, using the polled operations, the user input data from the first mathematical language to the identified encoding associated with the destination mathematical application comprises converting the user input data from the first mathematical language to an intermediary mathematical language.

20. The non-transitory computer-readable storage medium of claim 19, wherein the intermediary mathematical language is at least one of a universal language, a standard language, American Standard Code for Information Interchange (ASCII), and Unicode.

\* \* \* \* \*